June 18, 1968 A. TROOST ET AL 3,389,349

CIRCUIT ARRANGEMENT USING A NARROW BAND REJECTION FILTER

Filed March 30, 1964 2 Sheets-Sheet 1

Inventors:
Albert Troost
Hans Maass
Flori Vogler
Heinz-Theo Röttgers

By: Spencer & Kaye
ATTORNEYS

June 18, 1968 A. TROOST ET AL 3,389,349

CIRCUIT ARRANGEMENT USING A NARROW BAND REJECTION FILTER

Filed March 30, 1964 2 Sheets-Sheet 2

Inventors:
Albert Troost
Hans Maass
Flori Vogler
Heinz-Theo Röttgers

By: Spencer & Kaye
ATTORNEYS

United States Patent Office 3,389,349

Patented June 18, 1968

3,389,349

CIRCUIT ARRANGEMENT USING A NARROW BAND REJECTION FILTER

Albert Troost, Hans Maass, Flori Vogler, and Heinz-Theo Rottgers, Ulm (Danube), Germany, assignors to Telefunken Patentverwertungsgesellschaft m.b.H., Ulm (Danube), Germany Filed Mar. 30, 1964, Ser. No. 355,613
Claims priority, application Germany, Mar. 29, 1963, T 23,743
14 Claims. (Cl. 332—56)

The present invention relates to a circuit arrangement for the conversion of frequencies or frequency bands into other frequencies or frequency bands, respectively.

Many circuits for frequency conversion are known. All of these circuits have the same disadvantage, i.e., they are dependent upon inductances and transformers and, moreover, are relatively complicated in their construction. The use of inductances and transformers, for one thing, makes the circuit more expensive; but, very much more disadvantageous, is that because of the inductances and/or the transformer windings, it is not possible to construct the circuit system to be very small by using micro-miniaturization techniques.

It is the main object of the present invention to provide a circuit in which these disadvantages are no longer present.

It is another object of the invention to provide such a circuit which contains nothing but ohmic resistors and capacitors and which in accordance with micro-circuitry techniques can be produced simply, cheaply, and of small size.

These objects and others ancillary thereto are accomplished in accordance with preferred embodiments of the present invention wherein a four-pole network is used. This four-pole network comprises only resistors and condensers and has an attenuation maximum at a frequency which is determined by the values of the circuit elements used. At least one of the elements of the four-pole network is constructed to be variable or controllable. A potential is applied to the input of this four-pole network which has a frequency corresponding to the frequency of the attenuation maximum. The frequency to be converted is effective at the controllable element or elements in such a manner that a change in the resistance value of this element occurs at the rate of the frequency to be converted. Then, the voltage with the converted frequency is obtained from the output of the four-pole network.

Figure 1:
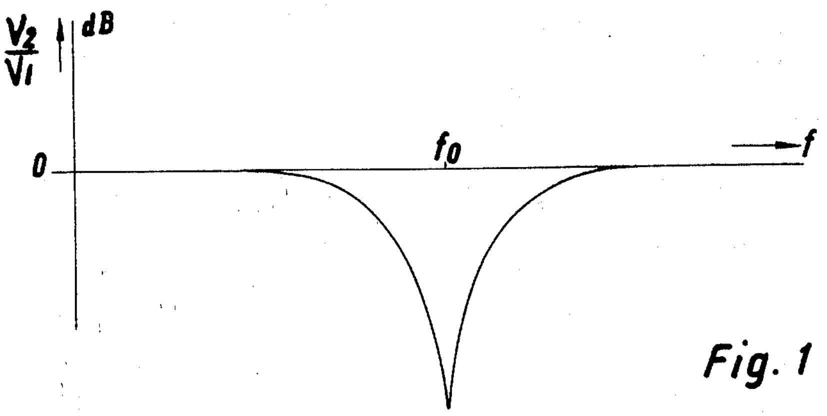

Additional objects and advantages of the present invention will become apparent upon consideration of the following description when taken in conjunction with the accompanying drawings in which:

FIGURE 1 is a graph of attenuation versus frequency.

Figure 2A:
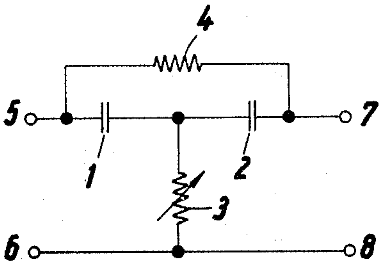

FIGURE 2*a* is a circuit diagram of a first form of bridged T-network.

Figure 2B:
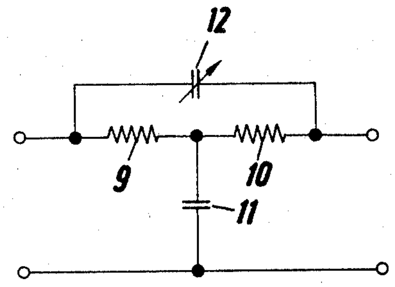

FIGURE 2*b* is a circuit diagram of a second form of bridged T-network.

Figure 3A:
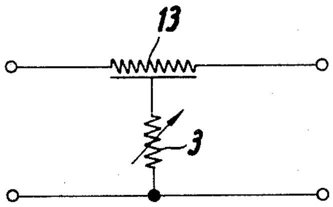

FIGURE 3*a* is a circuit diagram of the FIGURE 2*a* circuit using distributed resistance and capacitance.

Figure 3B:
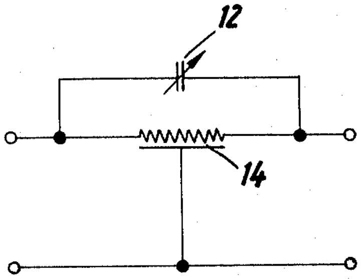

FIGURE 3*b* is a circuit diagram of the FIGURE 2*b* circuit using distributed resistance and capacitance.

Figure 4:
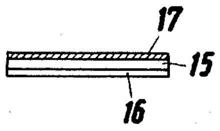

FIGURE 4 is a sectional view of a portion of a distributed network.

Figure 5A:
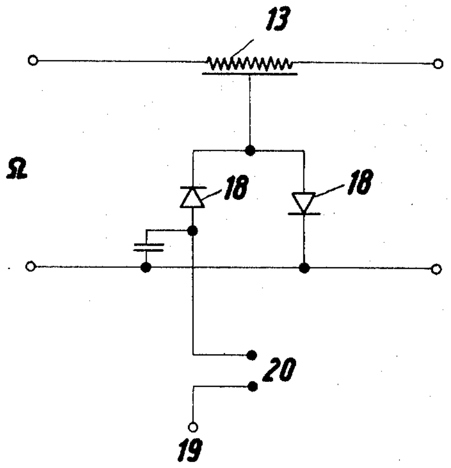

FIGURE 5*a* is a circuit diagram of an arrangement similar to FIGURE 3*a* for use in amplitude modulation.

Figure 5B:
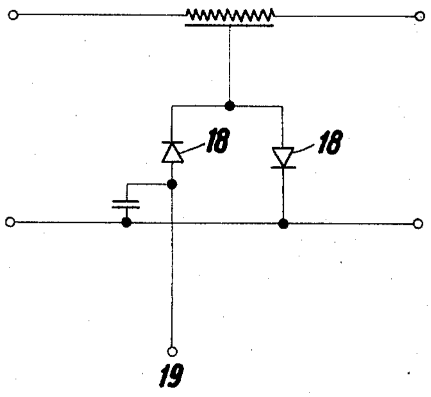

FIGURE 5*b* is a circuit diagram of an arrangement similar to FIGURE 3*a* for use in frequency multiplication.

Before considering the drawings in detail, it should be noted that the so-called T-network is an example of a four-pole or four-terminal network with an attenuation maximum at a certain frequency. This T-network may comprise, for example, capacitors in the series arms, an ohmic resistor in the bridging arm, and a controllable ohmic resistor or a capacitor in the shunt arm. The same properties are likewise displayed by a bridged T-network comprising ohmic resistors in the series arms, a capacitor in the shunt arm, and a controllable capacitor in the bridging arm. Such circuits can be employed for solving the problem set forth above.

In addition to the circuits described above, there are a number of further circuits which include only resistors and capacitors and have an attenuation maximum at a frequency which is determined by the values of the circuit elements used. In FIGURE 1, the relationship of the output voltage $V_2$ to the input voltage $V_1$ of such a circuit is plotted with respect to the frequency. It can be seen that, at the frequency $f_o$, an attenuation maximum occurs. It is already known to exploit this attenuation maximum for filter purposes and such filters are called narrow band rejection filters.

The circuits of the present invention can be used as amplitude modulators. In this mode of application, the carrier frequency voltage appears at the input of the four-pole or four-terminal network, while the modulating signal, for example, a low frequency voltage, is effective upon the controllable circuit element. Then the voltage which has been modulated in its amplitude can be obtained from the output of the four-pole network. In addition to voltages with higher frequencies, voltages are obtained there having the frequencies $\Omega$, $(\Omega+\omega)$, and $(\Omega-\omega)$, where $\Omega$ designates the carrier frequency and $\omega$ the modulation frequency. However, the voltage having the frequency $\Omega$ is more strongly attenuated in comparison to the side frequencies $(\Omega+\omega)$ and $(\Omega-\omega)$, than is the case in other modulators. But, there are examples in the art in which a small carrier frequency amplitude is necessary, as is the case, for example, in single or double sideband transmissions with synchronization of the oscillator on the receiver side by means of a vestigial carrier.

In the above-described embodiment, the frequency conversion according to the invention is used for amplitude modulation. According to a further feature of the invention, the circuit can also be employed for frequency multiplication. In this case, the voltage whose frequency is to be multiplied is applied to the input terminals, and this voltage is also effective upon the element constructed to be controllable, in the sense of a cylindrical variation of the resistance value of the element at the frequency to be multiplied. Then, voltages can be decoupled from the output of the four-pole network which have frequencies corresponding to a multiple of the input frequency. In order to obtain the multiplication, it is possible to apply the voltage with the frequency to be multiplied to the controllable element from an external source. However, there are also embodiments in which such a voltage application is no longer necessary. Rather, it is sufficient if the frequency to be multiplied is fed to the input of the four-pole network just once.

In principle, a "modulation" also takes place in the inventive frequency multiplier, the frequency of the "modulating" voltage being equal to the frequency of the voltage to be modulated." Here, as already mentioned above, it is not necessary to feed the modulating voltage separately, which, of course, is also possible. Rather, the "modulation" takes place automatically within the circuit by applying the voltage to be multiplied, if the four-pole network contains at least one controllable circuit element which changes its value (ohmic resistance and/or capacitance) cyclically at the rate of the voltage to be multiplied. This can be accomplished by using a current-controlled resistor (correspondingly driven diode) or a voltage-controlled capacitor (capacitance diode). At the output of the circuit, voltages having the frequencies Ω, 2Ω, 3Ω, etc. are obtained. Practical experiments have shown that, when using the circuit of the present invention, even the voltage having the frequency 30Ω has still a relatively large amplitude.

According to a further feature of the invention, the elements of the four-pole network—which is a frequency conversion circuit that can be used for amplitude modulation and frequency multiplication—with the exception of the element which is constructed to be controllable are arranged to be a network with distributed parameters (distributed parameter notch network). In this embodiment, the frequency of the voltage applied to the input terminals is largely suppressed at the output of the circuit. Such networks, as is known, can be made with the aid of evaporization techniques. When using this technique, an extremely compact construction of the circuit is possible. Furthermore, such a circuit arrangement has the advantage, when being used in amplitude modulation, that the carrier frequency is substantially suppressed at the output of the four-pole network. A circuit constructed in such a manner thus is especially well suited for use as a single or double side-band modulator. In frequency multiplication, on the other hand, it is not at all disadvantageous that the frequency of the voltage to be multiplied no longer appears at the output of the circuit, because a voltage of this frequency can be obtained at other places.

With more particular reference to the drawings, a bridged T-network is shown in FIGURE 2*a* wherein two capacitors 1, 2 are connected in the series arm of the T-network, and a controllable resistor 3, for example, a current-controlled semiconductor, a light-controlled photo resistor, a pressure-sensitive element, etc., is connected in the shunt arm. The two capacitors 1 and 2 are bridged by resistor 4. When using this circuit for the purpose of amplitude modulation, the carrier frequency Ω is applied to the input terminals 5, 6 of this circuit. If this circuit, because of the values of circuit elements 1 to 4, has an attenuation maximum which is at frequency Ω, and if the value of the resistor 3 is varied at the modulation frequency $\omega$, voltages having the frequencies Ω, (Ω—$\omega$), and (Ω+$\omega$) are, inter alia, obtained at the output of the circuit (terminals 7, 8). The carrier frequency here is, as already mentioned, of small amplitude. The same result can also be achieved with the circuit according to FIGURE 2*b* which is the counterpart of the circuit of FIGURE 2*a*. Here, the resistors 9 and 10, as well as the capacitor 11, are constructed to be constant elements, whereas the capacitor 12 is controllable and is changed at the modulation frequency.

The circuits of FIGURES 2*a* and 2*b* which have just been described for amplitude modulation can also be employed for frequency multiplication. Here, too, the voltage having the frequency Ω to be multiplied is fed to the input terminals, for example, 5, 6. Even though in this application the attenuation maximum of the four-pole network is at the frequency Ω and the elements 3 and 12, respectively, are electronically controllable elements, voltages having the frequencies Ω, 2Ω, 3Ω, etc., are obtained at the output of the circuit, for example, at terminals 7 and 8. However, the frequency Ω here occurs with small amplitude because of the attenuation maximum.

As already mentioned above, the circuit of the present invention has the advantage that it comprises solely ohmic resistors and capacitors. Thus, it can be constructed very small in accordance with known techniques. If, according to a further feature of the invention, the network including the components 1, 2 and 4 of FIGURE 2*a* or 9, 10, and 11 of FIGURE 2*b*, respectively, is constructed to be a network having distributed resistors and capacitors, the voltage with the input frequency Ω is practically nonexistent at the output. As mentioned above, this effect can be used by employing the circuit thus constructed for single and double side-band transmission because in such a case, as is known, the carrier frequency is to be suppressed completely. The side bands are obtained unchanged at the output.

If the circuit elements 1, 2, and 4 of FIGURE 2*a*, or 9, 10, and 11 of FIGURE 2*b*, respectively, are made using the above-mentioned technique, the representation of FIGURE 3*a* or 3*b*, respectively, is provided in which figures the elements 13 and 14 represent, respectively, the distributed network. In practice, the distributed network includes a small insulating platelet 15 (FIGURE 4) with a layer 16 vaporized thereupon (gold, for example) and a coating 17 of resistor material (chrome nickel).

A further manner of producing a distributed network is to vaporize the conductive layer, the dielectric layer, and the resistance layer one on top of the other. The circuits which are described above in greater detail may also be used for frequency multiplication. As already mentioned above, only the frequencies 2Ω, 3Ω, etc., appear at the output.

The controllable resistors and condensers may be realized, for example, by using electronically controllable semiconductors, the semiconductors being operated, in the one case, as controllable resistors and, in the other case, as controllable capacitors. In FIGURES 5*a* and 5*b*, the resistor 3 is formed by two diodes 18 controllable with respect to their resistance for operation as a circuit for amplitude modulation according to FIGURE 3*a*. The resistance variation can be described by the following expression:

$$R=R_o\ (q_o+q\ \sin\ \omega t)$$

where $q_oR_o$ ($q_o$ and $q$, respectively, are dimensionless factors) is understood to mean the resistance value necessary for setting the attenuation maximum at the carrier frequency Ω, and $\omega$, is understood to mean the modulation frequency. The output voltage of the network then is a function of the frequencies Ω and $\omega$, the amplitude of the output voltage being dependent upon $qR_o$ if the other elements have fixed values. The value $q_oR_o$ is determined by the D.C. voltage at terminal 19, while $qR_o \sin \omega t$ is determined by the modulation voltage applied to the terminals 20.

If a capacitor of the circuit is controlled for the purpose of modulation, similar considerations apply, the capacitance value $C_o$ taking the place of $R_o$. A modulation can also be achieved by simultaneously varying two elements. However, in this case attention must be paid to the fact that because of the simultaneous variation, not only will there be a parallel shift of the attenuation maximum according to FIGURE 1, but also a change of the shape of the curve. Namely, the magnitude of the attenuation maximum must change in order to achieve modulation.

Finally, it is possible, if necessary for certain reasons, to obtain an output voltage containing the carrier frequency Ω even if networks with destributed resistors and capacitors are used. It is only necessary to design the circuit with values such that the attenuation maximum is less strongly pronounced.

For obtaining a frequency multiplication, the voltage having the frequency Ω which is also applied to the input can be applied to the terminals 20 of FIGURE 5*a*. In the equations for R, the value Ω replaces the value $\omega$. As already mentioned above, it is not required to separately feed a voltage with the frequency Ω to the elements 18. Voltages of the frequencies 2Ω, 3Ω, etc., are also obtained at the output of the circuit according to FIGURE 5*a* if the terminals 20 of FIGURE 5*a* are short-circuited. This embodiment is shown in FIGURE 5*b*. The amplitudes of the output voltages of this circuit depend upon the value $qR_o$ if the other elements have fixed values. Thus, $q$ is a measure for the change of the resistance value by the voltage which is to be multiplied with respect to its frequency. The value $q_oR_o$ is determined by the D.C. potential at terminal 19. If, for the purpose of multiplication, a capacitor of the circuit is controlled, the capacitor 12 of FIGURE 3*b*, for example, is replaced by a capacitance diode. The working point on the characteristic curve of this diode is likewise determined by a voltage applied from an external source.

As can be seen from the above description, it is possible with the invention to produce modulators of very small construction. In order to give an idea of the size of a modulator according to the invention, it may be noted that such a circuit can be mounted on an area of 1 $cm^2$.

It will be understood that the above description of the present invention is susceptible to various modifications, changes, and adaptations, and the same are intended to be comprehended within the meaning and range of equivalents of the appended claims.

What is claimed is:

1. A frequency conversion circuit for converting a given frequency or frequency spectrum into a different frequency or frequency spectrum, said circuit comprising, in combination: a narrow band rejection filter in the form of a four-terminal network consisting solely of resistive and capacitive elements, having a resonant frequency at which the output is a minimum for a given input, and having input and output terminals, one of said elements being variable, means for applying a signal to the input terminals at the resonant frequency of the network, and means for applying a signal to the variable element, so that the signal appearing at the output terminals includes frequency components equal to the sum and difference of the frequencies applied to the input terminals and the variable element.

2. A circuit as defined in claim 1, wherein said elements are distributed-parameter, non-lumped elements.

3. A circuit as defined in claim 2, wherein a carrier frequency is applied to the input terminals and a modulating frequency is applied to the variable element, so that the circuit acts as a double side-band modulator.

4. A circuit as defined in claim 3, comprising a filter connected to said output terminals for suppressing one of the side-band frequencies, so that the circuit acts as a single side-band modulator.

5. A frequency conversion circuit for converting a given frequency or frequency spectrum into a different frequency or frequency spectrum, said circuit comprising, in combination: a narrow band rejection filter in the form of a four-terminal network including solely resistive and capacitive elements and having a resonant frequency at which the output is a minimum for a given input, said network having input and output terminals, one of said elements being variable and arranged so that a variation of the variable element at the resonant frequency will be produced when a signal at the resonant frequency is applied to said input terminals; and a signal source for applying signals to said input terminals at the resonant frequency of the network, whereby the signals at the output terminals contain components of *n* times the resonant frequency, where *n* is an integer assuming values from one to thirty.

6. A frequency conversion circuit for converting a given frequency or frequency spectrum into a different frequency or frequency spectrum, said circuit comprising, in combination: a narrow band rejection filter in the form of a four-terminal network consisting solely of resistive and capacitive elements, having a resonant frequency at which the output is a minimum for a given input, and having input and output terminals, one of said elements being variable; and a signal source for applying signals to said input terminals at the resonant frequency of the network, so that the variable element varies periodically at the resonant frequency, and the signal at the output terminals contains components of *n* times the resonant frequency, where *n* is an integer assuming the values one to thirty.

7. A circuit as defined in claim 6, comprising a filter connected to said output terminals for passing a selected output component and rejecting other output components.

8. A frequency conversion circuit for converting a given frequency or frequency spectrum into a different frequency or frequency spectrum, said circuit comprising, in combination: a narrow band rejection filter in the form of a four-terminal network consisting solely of resistive and capacitive elements, having a resonant frequency at which the output is a minimum for a given input, and having input and output terminals, one of said elements being externally controllable; a first signal source for applying a signal to said input terminals at the resonant frequency of the network; and control means for periodically varying the value of the externally controllable element at a control frequency, so that a signal appears at the output terminals whose frequency content includes a frequency equal to the sum of the control and input frequencies.

9. A circuit as defined in claim 8, wherein said elements are distributed-parameter, non-lumped elements, whereby the resonant frequency is highly suppressed at the output.

10. A circuit as defined in claim 9, wherein the four-terminal network is a bridged T-network including two series branches, a bridging branch and a shunt branch, the elements of which are capacitors in the series branches, a resistor in the bridging branch, and a controllable resistor in the shunt branch.

11. A circuit as defined in claim 9, wherein the controllable resistor is a diode.

12. A circuit as defined in claim 9, wherein the four-terminal network is a bridged T-network including two series branches, a bridging branch and a shunt branch, the elements of which are resistors in the series branches, a capacitor in the shunt branch and a controllable capacitor in the bridging branch.

13. A circuit as defined in claim 12, wherein the controllable capacitor is a capacitive diode.

14. A circuit as defined in claim 8, wherein said first signal source provides a carrier signal, said control means provides a modulating signal, and the output signal is the carrier signal, amplitude modulated at the modulating signal frequency.

References Cited

UNITED STATES PATENTS

| | | | |
|---|---|---|---|
| 2,191,315 | 2/1940 | Guanella | 332—56 X |
| 2,497,605 | 2/1950 | Hepp | 332—30 X |
| 2,559,023 | 7/1951 | McCoy | 332—30 X |
| 3,127,577 | 3/1964 | LaPointe | 332—47 X |
| 3,195,073 | 7/1965 | Penn | 332—45 |
| 3,212,033 | 10/1965 | Husher et al. | 332—52 |

OTHER REFERENCES

Kaufman: Proceedings of the IRE "Theory of a Monolithic Null Device and Some Novel Circuits," pp. 1540–1545, vol. 48, September 1960.

Jenkins: Electrical Manufacturing, "Circuit Applications of Voltage, Sensitive Capacitors," pp. 83–88, 300, 302, December 1954.

ALFRED L. BRODY, *Primary Examiner.*